(12) United States Patent
Kim et al.

(10) Patent No.: US 7,217,025 B2
(45) Date of Patent: May 15, 2007

(54) BACKLIGHT UNIT

(75) Inventors: Jin-hwan Kim, Suwon (KR);
Hwan-young Choi, Anyang (KR);
Moon-gyu Lee, Suwon (KR); Su-mi Lee, Suwon (KR); Jin-seung Choi, Suwon (KR); Jee-hong Min, Yongin (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 218 days.

(21) Appl. No.: 10/700,050

(22) Filed: Nov. 4, 2003

(65) Prior Publication Data

US 2004/0170011 A1  Sep. 2, 2004

(30) Foreign Application Priority Data

Nov. 4, 2002  (KR) .................. 10-2002-0067969

(51) Int. Cl.
*F21V 8/00* (2006.01)
(52) U.S. Cl. .................. 362/610; 362/608; 362/615; 362/621
(58) Field of Classification Search ................ 362/600, 362/615, 621, 622, 612, 613, 607, 608, 555, 362/559, 560, 561, 339, 330, 800, 602, 604, 362/610, 26, 27, 558; 385/50, 146; 40/546
See application file for complete search history.

(56) References Cited

U.S. PATENT DOCUMENTS

| 6,048,071 | A  | * | 4/2000  | Sawayama ............... 362/603 |
| 6,700,634 | B2 | * | 3/2004  | Taniguchi et al. ........ 362/600 |
| 6,805,468 | B2 | * | 10/2004 | Itoh et al. ............... 362/560 |
| 6,979,095 | B2 | * | 12/2005 | Min et al. ............... 362/610 |

FOREIGN PATENT DOCUMENTS

| JP | 2002-260427 | * | 9/2002 |
| JP | 2002-289023 |   | 10/2002 |

* cited by examiner

*Primary Examiner*—Sandra O'Shea
*Assistant Examiner*—Bao Q. Truong
(74) *Attorney, Agent, or Firm*—Sughrue Mion, PLLC

(57) ABSTRACT

A backlight unit is provided including a light guide panel (LGP), a point light source emitting light at an edge of the LGP; and a refraction member being positioned between the point light source and the LGP and refracting the light emitted from the point light source toward the optical axis of the point light source in order to reduce the azimuth angle of the light that is incident upon the LGP. The refraction member includes a prism array in which a V-shaped prism pattern is repeatedly arrayed, the apex of the prism pattern facing the edge of the LGP, and a transparent portion that prevents the light from being totally reflected by the prism pattern in a region along an optical axis of the light source.

9 Claims, 9 Drawing Sheets

BACKLIGHT UNIT

CROSS-REFERENCE TO RELATED APPLICATION

This application claims the benefit of Korean Patent Application No. 2002-67969, filed Nov. 4, 2002 in the Korean Intellectual Property Office, the disclosure of which is incorporated herein in its entirety by reference.

BACKGROUND OF THE INVENTION

1. Field of the Invention

The present invention relates to a backlight unit, and more particularly, to an edge light backlight unit using a light guide panel (LGP) and a point light source.

2. Description of the Related Art

In general, flat panel displays are largely classified into light emitting displays and light receiving displays. Light emitting flat displays include elements such as a cathode ray tube, a plasma display, an electron emitting device, and a fluorescent display.

In comparison, a light receiving type flat panel display device (e.g., a liquid crystal display device) forms an image not by emitting light by itself, but by receiving light from the outside. Thus, it is difficult to view an image on such a display device in dark places. Accordingly, a backlight unit for emitting light is installed at a rear surface of the light receiving type flat panel display device. Such a backlight unit has been used in surface light source devices (e.g., an illuminating signboard), as well as light receiving displays (e.g., a liquid crystal display device).

The backlight unit may be either a direct light backlight unit, or an edge light backlight unit, according to the arrangement of light sources thereon. The direct light backlight provides a plurality of lamps directly under an LCD so as to directly illuminate light on a liquid crystal panel. The edge light backlight unit provides lamps at a sidewall of an LGP in order to illuminate light on a side of the LGP and transmit the light to a liquid crystal panel.

More specifically, the edge light type may use a linear light source or a point light source as a light source. Typically, a cold cathode fluorescent lamp (CCFL) is used as the linear light source, while a light emitting diode (LED) is used as the point light source. The CCFL can emit a strong white light with high brightness and high uniformity, and can enable a large size design of a device. However, the CCFL is disadvantageous since it is operated by a high frequency AC signal and has a narrow operational temperature range. In comparison, the LED exhibits a lower brightness and uniformity than the CCFL, but is operated by a DC signal and has a long life span and a wide operational temperature range. Further, the LED can be manufactured therein.

When an LGP is used in an edge light backlight unit, the light output from the linear or point light source is input to an edge of the backlight unit to be incident upon the LGP. The LGP then converts the incident light into a surface light and outputs it in a vertical (i.e., orthogonal to the LGP surface) direction. The LGP is formed of a material having high light transmittance (e.g., an acryl-based transparent resin such as polymethyl methacrylate (PMMA), or an olefin-based transparent resin). A scattering pattern or a hologram pattern is also formed on the LGP so that light, which is input to an edge of the backlight unit and is incident upon the LGP, is output to a light emitting surface.

FIG. 1 is a perspective view of a related art backlight unit of an edge light type using a point light source. FIG. 2 is a cross-sectional view of the edge light backlight unit of FIG. 1. Referring to FIG. 1, three LEDs 20, which are point light sources, are installed at an edge 11 of an LGP 10. A hologram pattern 30 is formed at a rear surface of the LGP 10 in order to emit light input from the LEDs 20 to a light emitting surface 12.

The LEDs 20 emit light toward the edge 11 of the LGP 10. The LEDs 20 are point light sources. Each LED 20 emits light within an azimuth angle of ±90° with respect to an optical axis 21, as shown in FIG. 3. An azimuth angle, at which the intensity of light is half of the maximum value $I_{max}$ of the light intensity, is called a radiation angle. In the case of an LED, light is emitted at a radiation angle of ±45°.

The light output from the LCDs 20 is incident upon the LGP, passes through the edge 11, 10, and finally, is incident on the hologram pattern 30. The hologram pattern 30 having a diffraction grid structure formed perpendicular to an optical axis 21 changes the incident light to a surface light and makes the surface light proceed through the light emitting surface 12 which is an upper surface of the light guide panel 10.

The hologram pattern 30 can emit light at the highest efficiency when the light is incident on the hologram pattern 30 at an angle of 90°. Also, as the distribution of an incident azimuth angle of the light incident on the hologram pattern 30 decreases, a uniform brightness can be obtained at the light emitting surface 12. If the brightness of the light emitting surface 12 is not uniform, a screen appears to be smeared.

For example, in a narrow range of about 1 cm, a change in brightness of about 0.9 is detected as a smear. However, when the brightness changes gradually from the central portion of the screen to an edge portion thereof, a change in brightness of about 0.8 is not detected as a smear. Thus, a uniformity of brightness over 0.8 is needed. In particular, to obtain a quality image, a uniformity of brightness over 0.9 is needed.

FIG. 4 is a diagram illustrating the distribution of light output from the conventional backlight unit of FIG. 1. The light guide panel 10 is divided into three portions, that is, a near portion 40, a middle potion 50, and a far portion 60, sequentially from the edge 11 where the LEDs 20 are installed. FIG. 4 also shows the distribution of the output of light, and it can be seen that the middle portion 50 and the far portion 60 have a wider light output distribution compared to the near portion 40.

FIG. 5 is a graph showing the brightness at the light emitting surface 12 of the edge light backlight unit shown in FIG. 1. In the graph, the vertical axis indicates brightness and the horizontal axis indicates FWHM (full width half maximum) showing a light emitting angle at the light emitting surface 12. Three curves C1, C2, and C3 from the left side indicate the brightness of the near portion 40, the middle portion 50, and the far portion 60, respectively. Referring to FIG. 5, it can be seen that the brightness of the near portion 40 is greater than those of the middle portion 50 and the far portion 60. The FWHM of the near portion 40 is 20°/20° while those of the middle portion 50 and the far portion 60 are 20°/35° which are relatively wider than that of the near portion 40. In 20°/35°, the first angle "20°" and the second angle "35°" denote FWHMs in an X direction and a Y direction, respectively.

The irregularity of brightness is caused because the distribution of an incident azimuth angle of the light incident on the hologram pattern 30 is different in each of the near portion 40, the middle portion 50, and the far portion 60.

Thus, an efficiency of the light emission by the hologram pattern 30 and the distribution of an emitting azimuth angle of the emitting light are different in the three portions. Generally, the larger the azimuth angle of light input to the LGP 10, the more the brightness of the light emitting surface 12 becomes non-uniform.

Such a problem occurs in an LGP having a scattering pattern as well as an LGP having a hologram pattern.

SUMMARY OF THE INVENTION

The present invention provides an edge light backlight unit in which the azimuth angle of light output from a point light source is reduced before being incident upon a light guide panel (LGP), thereby improving the uniformity of the brightness of a light emitting surface.

According to an aspect of the present invention, there is provided a backlight unit comprising a light guide panel (LGP); a point light source emitting light and arranged at an edge of the LGP; and a refraction member being positioned between the point light source and the LGP. The refraction member is shaped to refract the light emitted from the point light source in order to reduce the azimuth angle of the light that is incident upon the LGP.

The refraction member comprises a prism array in which a V-shaped prism pattern is repeatedly arrayed, the apex of the prism pattern facing the edge of the LGP. The angle of the apex of the prism may fall within a range from 80° to 120°.

The refraction member further comprises a transparent member installed between the point light source and the LGP, and the prism array is manufactured in the form of a prism sheet and attached to the transparent member.

The refraction member may further comprise a transparent portion that prevents the light from being totally reflected by the prism pattern in a region along an optical axis of the light source. The transparent portion may be formed in the prism array by removing the prism pattern within a predetermined angle with respect to the optical axis of the light source. Alternatively, the transparent portion may be formed by removing a portion of the prism array within a predetermined angle with respect to the optical axis of the light source.

The width of the transparent portion may be determined between a range that the full width half maximum (FWHM) of the light, which is incident upon the LGP, is at a minimum value, and a range that the light flux/steradian is at a maximum value. The transparent portion may be formed to allow light emitted from the point light source within an angle of ±12° with respect to the optical axis of the point light source to pass through. The refraction member may be united with the LGP.

A hologram pattern having a diffraction grating structure may be formed on the LGP.

According to another aspect of the present invention, there is provided a backlight unit comprising: an LGP; and a point light source emitting light at an edge of the LGP, wherein a refraction member is formed in the LGP to refract light emitted from the point light source as it enters the LGP. The refraction member is shaped to refract the light emitted from the point light source toward the optical axis of the point light source.

The refraction member comprises a hollow portion installed in the LGP to pass through the LGP in the vertical direction at a predetermined distance from the edge of the LGP facing the point light source; and a prism array installed at the edge of the hollow portion facing the point light source, wherein a V-shaped prism pattern is repeatedly arrayed and the apex of the prism pattern faces the hollow portion.

The angle of the apex of the prism may fall within a range from 80° to 120°.

The refraction member may further comprise a transparent portion that prevents the light from being totally reflected by the prism pattern in a region along an optical axis of the light source. The transparent portion may be formed in the prism array by removing the prism pattern within a predetermined angle with respect to the optical axis of the light source.

The width of the transparent portion may be determined between a range that the full width half maximum (FWHM) of the light, which is incident upon the LGP, is at a minimum value, and a range that the light flux/steradian is at a maximum value. The transparent portion may be formed to allow light emitted from the point light source within an angle of ±12° with respect to the optical axis of the point light source to pass through.

A hologram pattern having a diffraction grating structure is formed on the LGP.

BRIEF DESCRIPTION OF THE DRAWINGS

The above and other aspects and advantages of the invention will become more apparent by describing in detail exemplary embodiments thereof with reference to the attached drawings in which.

DETAILED DESCRIPTION OF EXEMPLARY EMBODIMENTS

Exemplary embodiments of the present invention will now be described with reference to the accompanying drawings. The described exemplary embodiments are intended to assist the understanding of the invention, and are not intended to limit the scope of the invention in any way.

Figure 6:
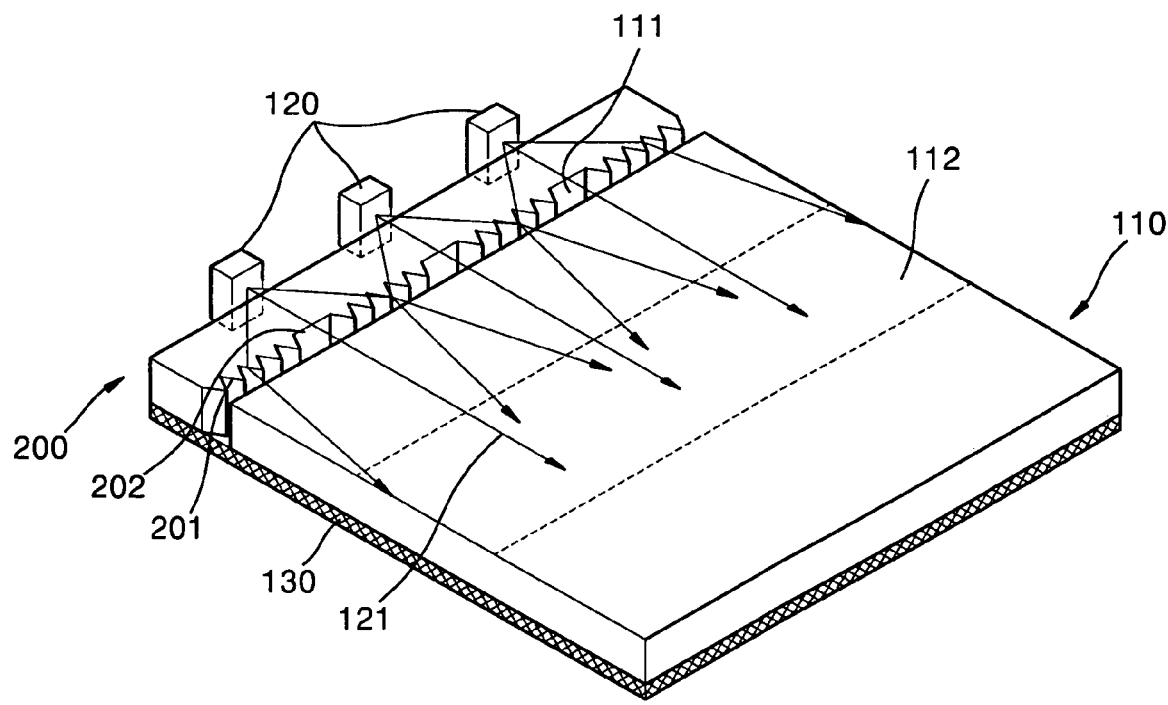
FIG. 6 is a schematic perspective view of a backlight unit according to a first exemplary embodiment of the present invention.
Figure 7:
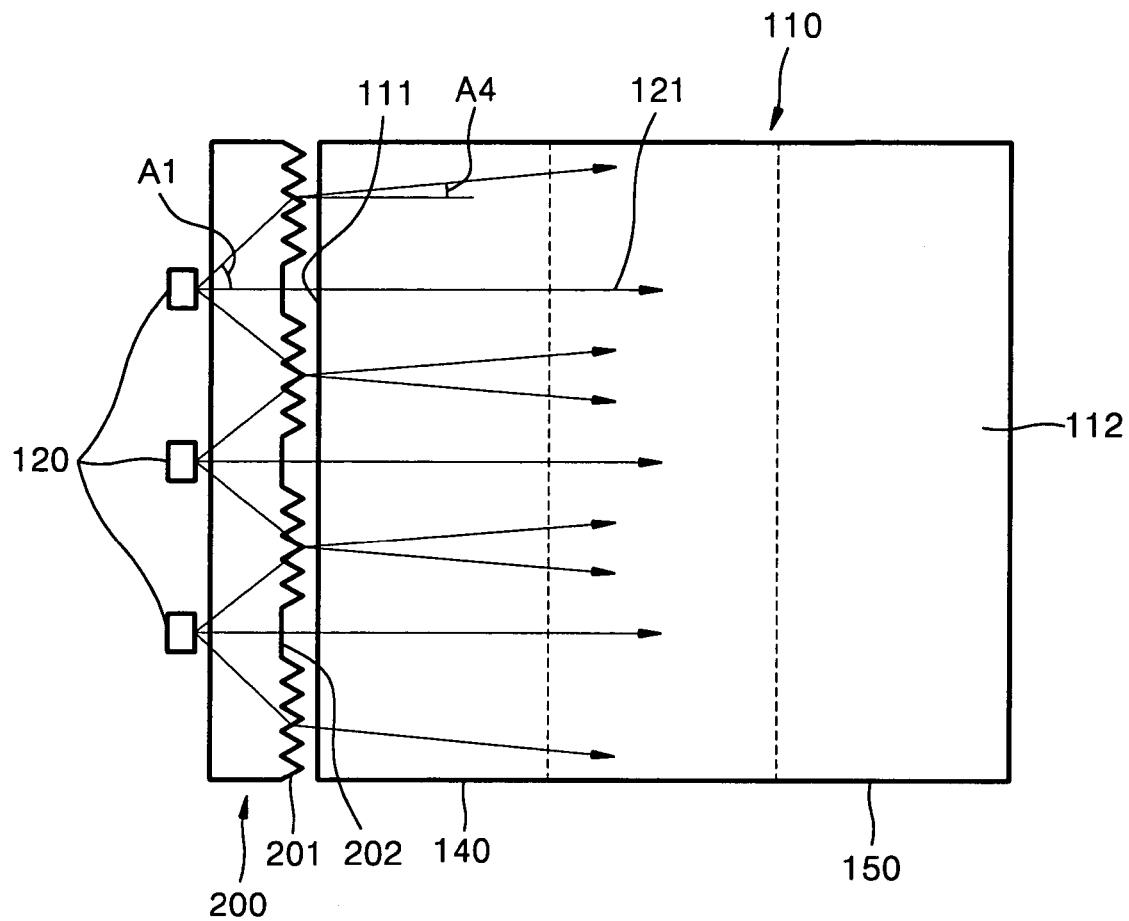
FIG. 7 is a plan view of the backlight unit of FIG. 6, according to the first exemplary embodiment of the present invention.

FIG. 6 is a schematic perspective view of a backlight unit according to a first embodiment of the present invention, and FIG. 7 is a plan view of the backlight unit of FIG. 6.

Referring to FIGS. 6 and 7, three light emitting diodes (LEDs) 120, which are point light sources, are installed along an edge 111 of a light guide panel (LGP) 110, and a prism array 200 is installed between the LGP 110 and the LEDs 120. Also, a transparent portion 202, in which a prism pattern 201 is not formed, is installed in an area through which optical axes 121 of the LEDs 120 passes. A hologram pattern 130 is formed at a rear surface of the LGP 110.

The LGP 110 is made of a transmissive material, such as an acryl-based transparent resin having a refractive index of about 1.49 and a specific gravity of about 1.19. Alternatively, the LGP 110 may be formed of an olefin-based transparent resin having a specific gravity of about 1.0 in order to reduce the weight of the LGP 110. The LGP 110 is usually about 2–3 mm thick and may have a wedge shape so that the thickness of the LGP 110 decreases from an edge on which light is incident to the opposite edge to reduce the weight thereof. The size of the LGP 110 depends on the size of an image display (not shown), e.g., a liquid crystal display (LCD), which is installed on the light emitting surface 112.

Figure 3:
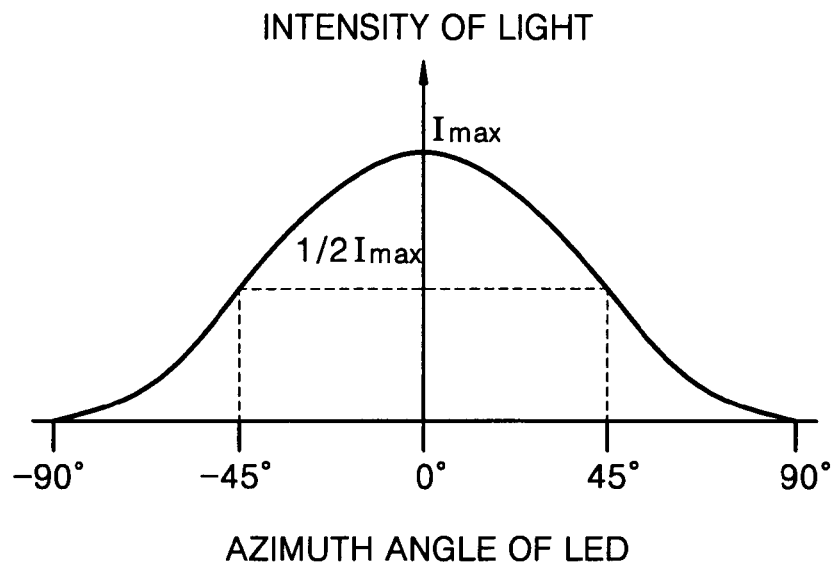
FIG. 3 is a graph illustrating the azimuth angle of light emitted from a light emitting diode (LED)
Figure 4:
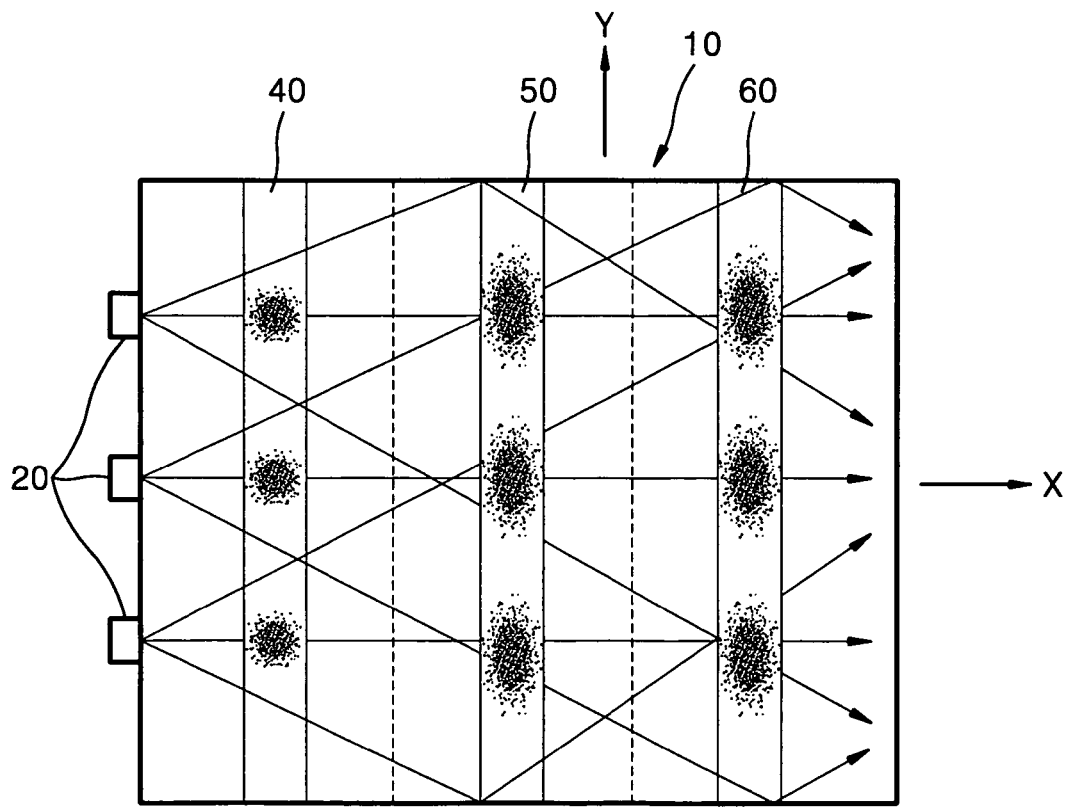
FIG. 4 is a diagram illustrating the distribution of light emitted from the conventional backlight unit of FIG. 1.
Figure 5:
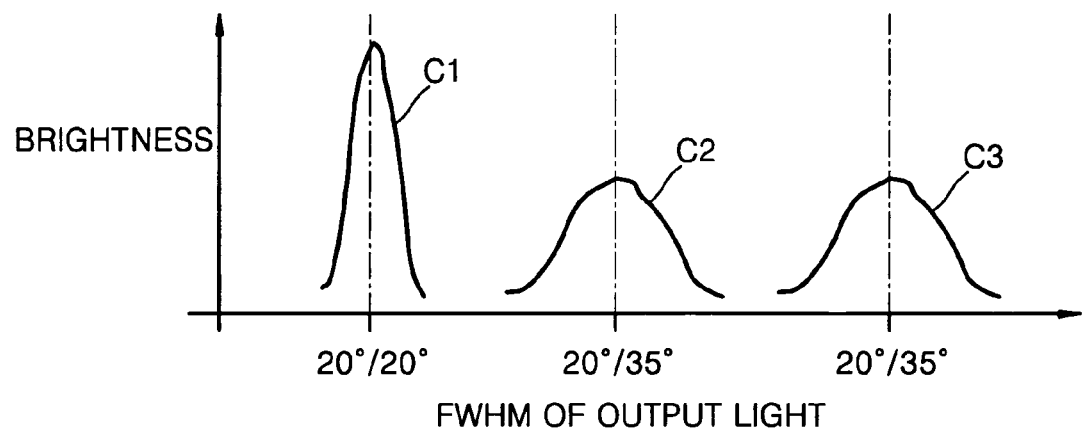
FIG. 5 is a graph illustrating the front brightness of a light emitting surface of the conventional backlight unit of FIG. 1.

As previously mentioned, the LED 120 refers to a light emitting diode that is used as a point light source. The LED 120 emits light within a range of ±90° with respect to an optical axis 121 as shown in FIG. 3. The angle of light at which light intensity is half of the maximum value $I_{max}$ of light intensity, is called a radiation angle. In general, an LED has a radiation angle within a range of about ±45°. According to the first embodiment, the LGP 110 includes the three LEDs 120 along the edge 111 thereof but the number of LEDs is not limited. In other words, the number of LEDs can be increased in accordance with the size of the LGP 110 and desired brightness of the backlight unit. Also, LEDs may be further installed at the other edges of the LGP 110.

The hologram pattern 130 is an example of a device that receives light, which is incident upon the edge 111 of the LGP 110, and emits the light to the light emitting surface 112. Referring to FIG. 6, the hologram pattern 130 is provided at the rear surface of the LGP 110. The hologram pattern 130 may be manufactured in a diffraction grating structure that has, for example, a period of about 0.4 μm and a depth of about 0.2 μm. Alternatively, the LGP 110 may include a scattering pattern that scatters incident light in the vertical direction and emits the light via the outputting surface 112 to the outside of the backlight unit. The characteristics of a scattering pattern are well known to those skilled in the art and thus their detailed descriptions will be omitted here.

The prism array 200 includes a refraction member that refracts light emitted from each of the LEDs 120 toward an optical axis 121, and is manufactured by repeatedly arranging the V-shaped prism pattern 201 along the edge 111 of the LGP 110 as shown in FIGS. 6 and 7. The apexes of the prism pattern 201 face the edge 111 of the LGP 110. The apex angles of the prism pattern 201 are determined in consideration of the range of reducing the azimuth angle of light incident upon the LGP 110. The prism array 200 may be made by cutting or injection molding an acryl-based transparent resin or an olefin-based transparent resin, which, as noted above, may also be used as the material for the LGP 110.

Some of the light at the near axis region, which are emitted from the LEDs 120, may be totally reflected by the prism array 200. In this case, the amount of light incident on the LGP 110 is reduced, and as a result, the brightness of the light emitting surface 112 decreases. To prevent such a reduction in brightness, the refraction member may further include transparent portions 202 that prevent the light from being totally reflected by the prism pattern in a region along an optical axis of the light source. As shown in FIG. 6, the transparent portions 202 may be formed in the prism array by removing the prism pattern within a predetermined angle with respect to the optical axis of the light source. Alternatively, although not shown in the drawings, the transparent portions 202 may be formed by removing a portion of the prism array within a predetermined angle with respect to the optical axis of the light source.

The transparent portion may be formed to a certain width with respect to the optical axis 121 of each LED 120. The width of the transparent portion 202 may be determined such that light passes through the transparent portion 202 at about ±12° with respect to the optical axis 121 of the LED 120. However, in general, the width of the transparent portion 202 is experimentally determined in consideration of the light flux/steradian, full width half maximum (FWHM), and the total light flux.

Figure 8:
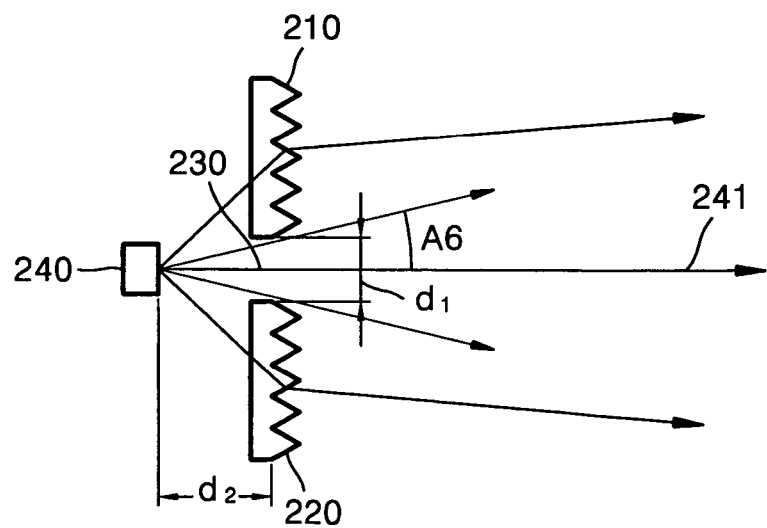
FIG. 8 is a plan view of an apparatus that measures the width of a projecting portion.

FIG. 8 illustrates an apparatus used for a test of measuring the optimum width of a transparent portion. Referring to FIG. 8, two prism arrays 210 and 220 are arranged to be far away at a distance $d_1$ from each other, a transparent portion 230 is positioned between these prism arrays 210 and 220, and an LED 240 is placed to be far away at a distance $d_2$ from left sides of these prism arrays 210 and 220. The optical axis 241 of the LED 240 passes through a point corresponding to a half d½ of the distance $d_1$. Under such conditions, when the LED 240 emits light and the light passes through these prism arrays 210 and 220, the amount of the light is measured while changing the distance $d_1$ between these prism arrays 210 and 220.

Figure 9:
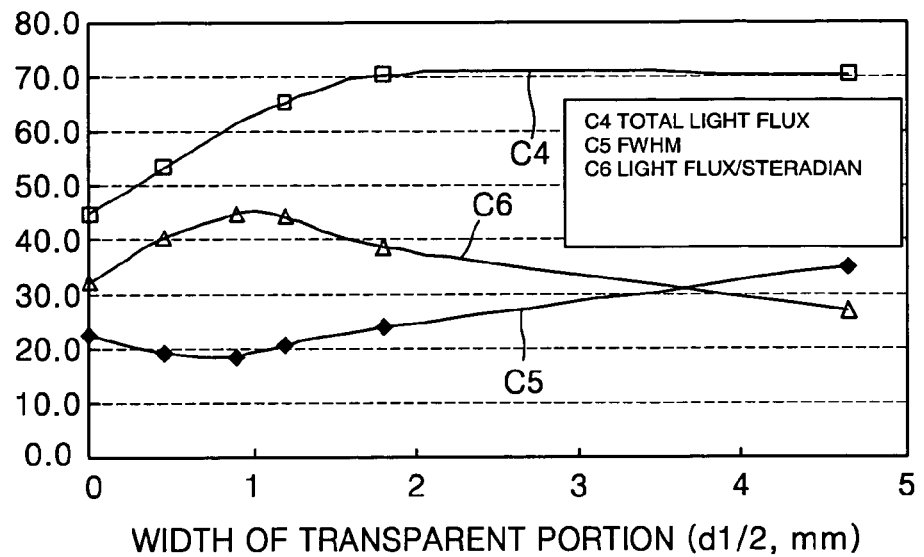
FIG. 9 is a graph illustrating the relationship between the width of a transparent portion and the amount of light passing through a prism array.

FIG. 9 is a graph illustrating the relationship between the distance $d_1$ between the prism arrays 210 and 220, and the amount of light passing through these prism arrays 210 and 220, when the distance $d_2$ between the prism arrays 210 and 220 and the LED 240 is 5 mm. Curves C4, C5, and C6 denote the total light flux, the FWHM and the light flux/steradian of the light which passes through these prism arrays 210 and 220 and the transparent portion 230, respectively. The width of the transparent portion 230 may be determined to obtain high total light flux, high light flux/steradian, and low FWHM. Referring to FIG. 9, the optimum width $d_2$ of the transparent portion 230 is 2 mm, when the distance $d_1$ is 5 mm. In this case, the light, which passes through the transparent portion 230, forms an angle A6 of ±12° with respect to the optical axis 241 of the LED 240.

Hereinafter, the operations of a backlight unit of FIG. 6, according to the first embodiment of the present invention, will be explained.

Referring to FIG. 7, light emitted from each of the LEDs 120 is incident upon the prism array 200. As mentioned above, the LEDs 120, which are point light sources, emit light within the azimuth angle of ±90° toward the prism array 200. However, most parts of the light emitted from the LEDs 120 falls within the radiation angle A1 of the light, and thus only the ranges of the radiation angles A1 are indicated with arrows in FIG. 7.

When light passes through a border between media having different indexes of refraction, the light is refracted so that an angle of incidence of the light is different from an angle of transmittance. Further, when light sequentially travels between a medium having a smaller index of refraction and a medium having a larger index of refraction, the transmitted light is refracted toward a line perpendicular to the border between the media (as compared to the incident light). In other words, the angle of transmittance is smaller than that angle of incidence. Conversely, if the light sequentially travels between a medium having a larger index of refraction and a medium having a smaller index of refraction, the transmitted light is refracted away from a line perpendicular to the border between the media (as compared to the incident light). Thus, the angle of transmittance is larger than the angle of incidence. The prism array 200 uses this relationship of refraction of light due to its passing through media having different indexes of refraction to provide the effects of the invention.

Figure 10:
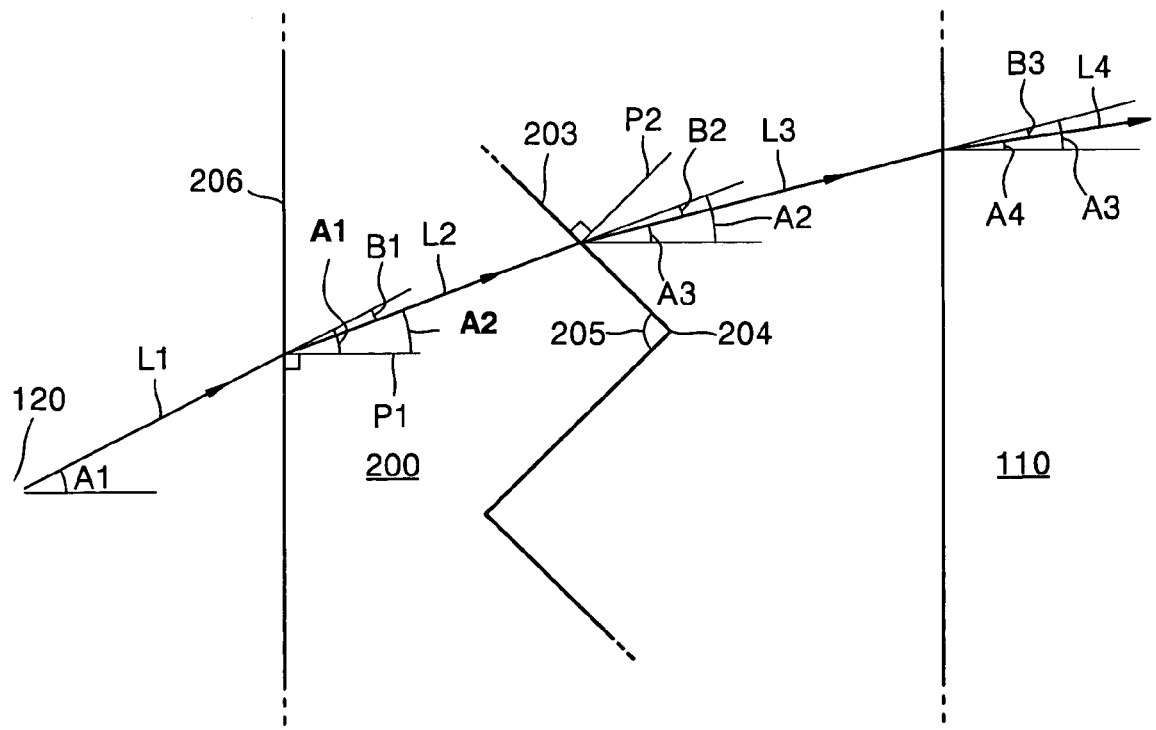
FIG. 10 illustrates the refraction of light passing through a prism array.

FIG. 10 illustrates in detail the refraction of light passing through the prism array 200. Referring to FIG. 10, the prism array 200 is arranged such that its apex 204 faces the LGP 110. Additionally, a medium with an index of refraction smaller than that of the prism array 200 (e.g., air) is positioned between the LED 120 and the prism array 200, and between the prism array 200 and the LGP 110.

Light L1 having a radiation angle A1 is initially emitted from the LED 120 and is incident upon a plane of incidence 206 of the prism array 200. The light L1 sequentially travels between a medium (e.g., air) having a smaller index of refraction and a medium having a larger index of refraction (e.g., prism array 200). Accordingly, when the light L1 passes through the plane of incidence 206, the light L1 is refracted toward a line P1 orthogonal to the plane of incidence 206, becoming a light L2 having a radiation angle A2.

Next, the light L2 travels through prism 200 and is incident on an incline plane 203. Here, light L2 travels sequentially through a medium having a larger index of refraction (e.g., prism array 200) and a medium having a smaller index of refraction (e.g., air). When the light L2 passes through the incline plane 203, it is therefore refracted away from a line P2 orthogonal to the incline plane 203 and becomes a light L3 having a radiation angle A3.

Next, the light L3 is incident upon the LGP 110, is again refracted (similarly to the refraction relationship between L1 and L2 discussed above), and becomes light L4 having a radiation angle A4.

This arrangement results in A1>A2>A3>A4. Accordingly, the radiation angle A4 of the light L4, which is incident within the LGP 110, is smaller by the sum of angles B1, B2, and B3 than the radiation A1 of the light L1 emitted from the LED 120. If necessary, the light L4 may be parallel to the optical axis 121.

Thus, when light is incident upon the prism array 200, the light emitted along the optical axes of the light sources passes through the transparent portions 202 with little or no refraction, but the remaining light emitted is refracted through the prism pattern 201. The refraction of the light causes the radiation angle A1 to be reduced to the radiation angle A4 as shown in FIG. 7.

Figure 11:
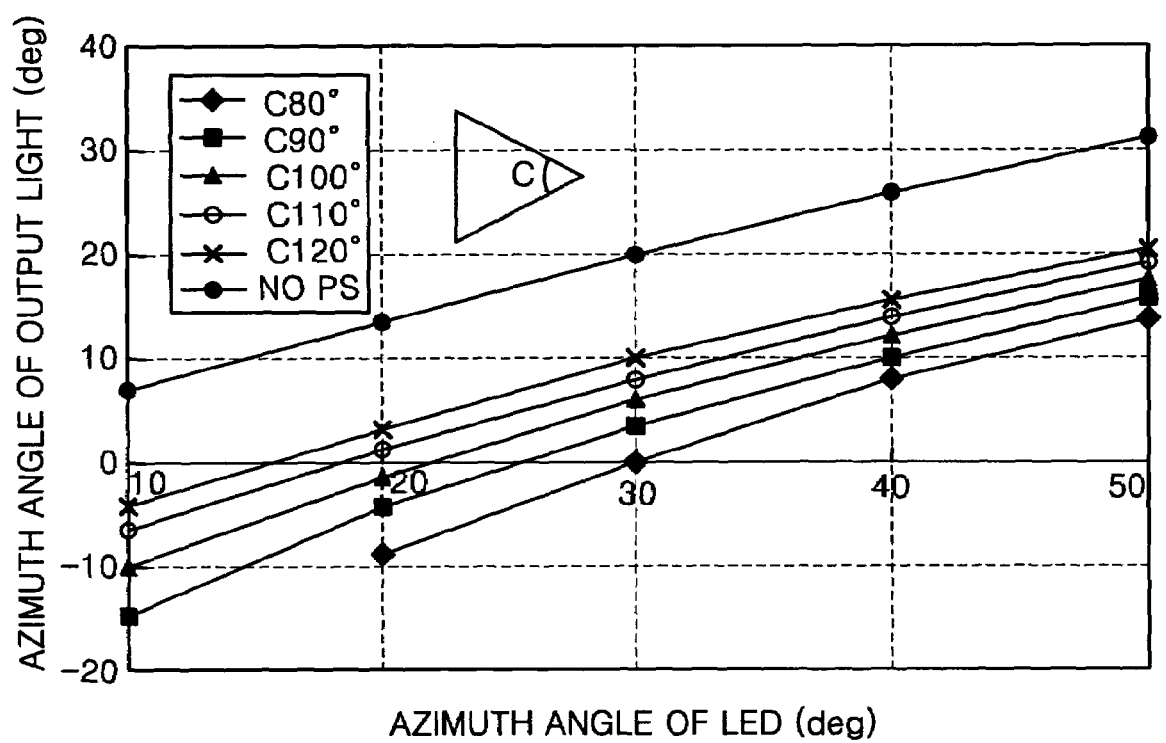
FIG. 11 is a graph illustrating the relationship between the azimuth angle of light, which is emitted from an LED while changing the apex angle of a prism and then incident upon a prism array, and the azimuth angle of light which the prism array.

FIG. 11 is a graph illustrating the relationship between the azimuth angle of light that is emitted from the LED 120 and incident on the prism array 200, and the azimuth angle of light output from the prism array 200 while changing the apex angle 205 of the prism array 200 shown in FIG. 10. In detail, FIG. 11 illustrates the relationship between the azimuth angle of the incident light and the azimuth angle of the output light, in cases where the apex angles of the prism array 200 are 80°, 90°, 100°, 110°, 120°, and a comparative example that does not adopt the prism array 200, respectively. FIG. 11 reveals that the range of the azimuth angle of the output light is smaller when the prism array 200 is used than when the prism array 200 is not used. For instance, if the apex angle 205 is 90°, all of the light incident on the prism array 200 at 0–50° are output to the prism array 200 within a range of ±15°.

After the light passes through the prism array 200 and is incident within the LGP 110, it is diffracted by the hologram pattern 130 formed at a rear surface of the LGP 110 and is transmitted to the light emitting surface 112.

Figure 1:
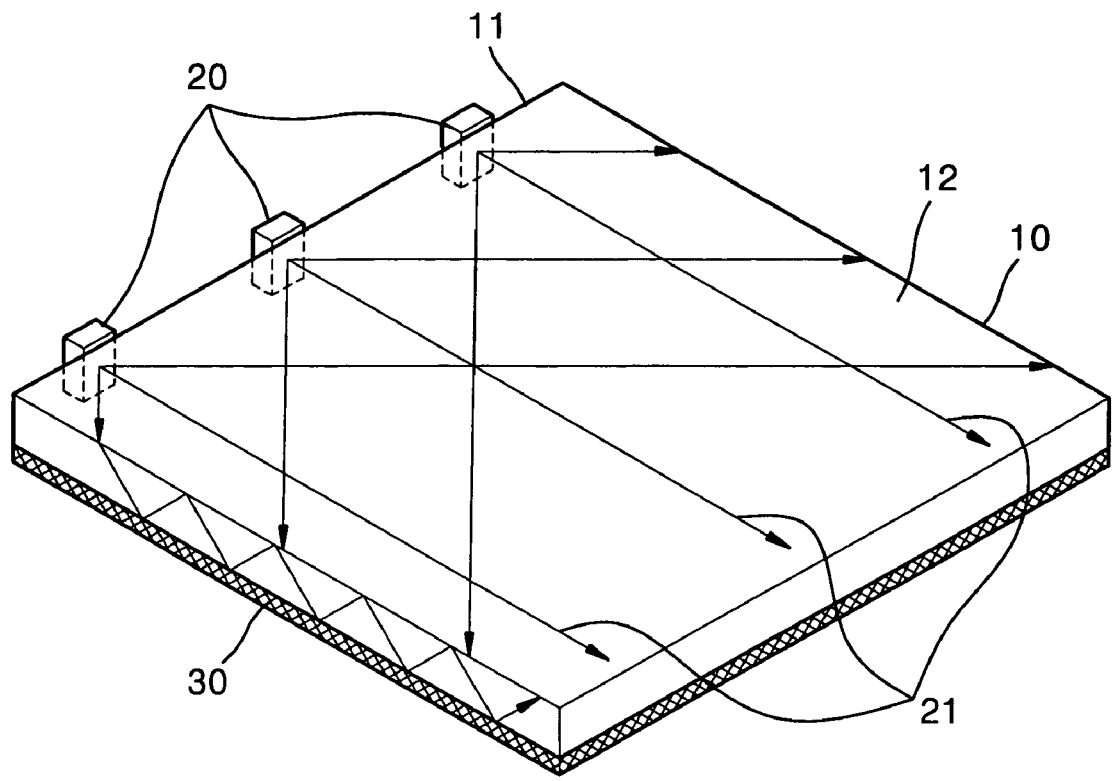
FIG. 1 is a schematic perspective view of a conventional edge light backlight unit using a point light source.
Figure 2:
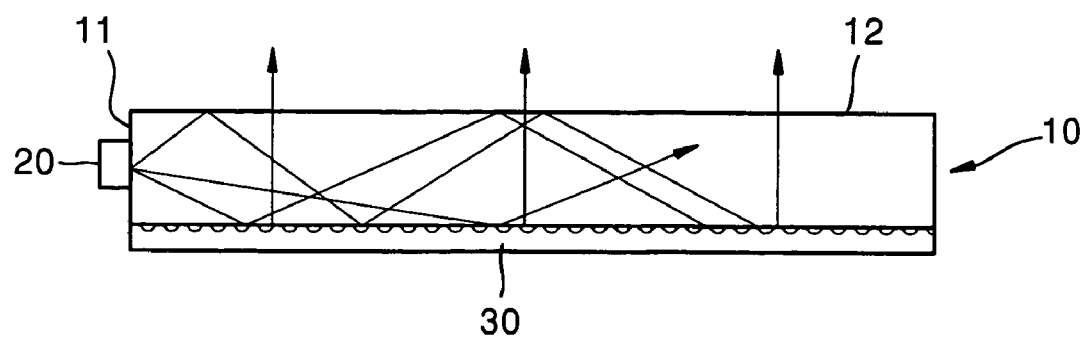
FIG. 2 is a cross-sectional view of the edge light backlight unit of FIG. 1.
Figure 12:
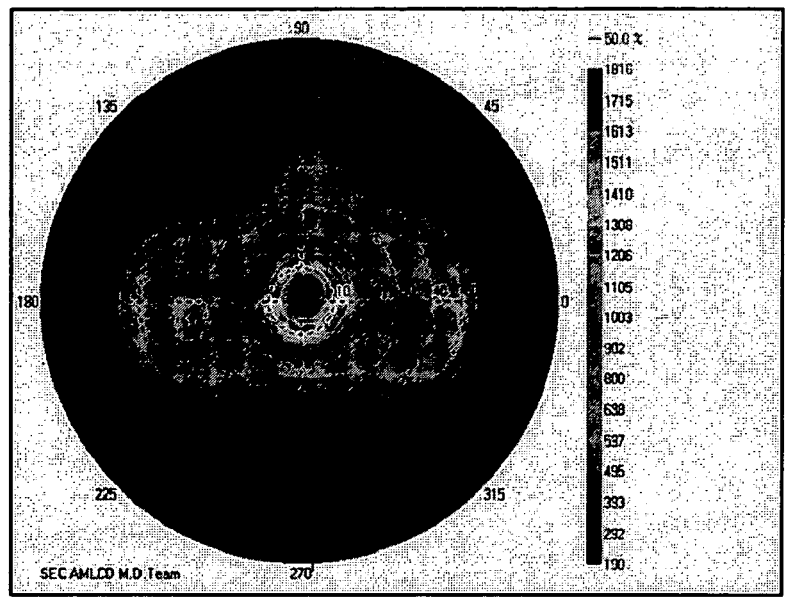
FIGS. 12 and 13 are graphs illustrating results of measurement of the brightness of light at a near portion and a far portion of the conventional backlight unit of FIG. 1, respectively.
Figure 13:
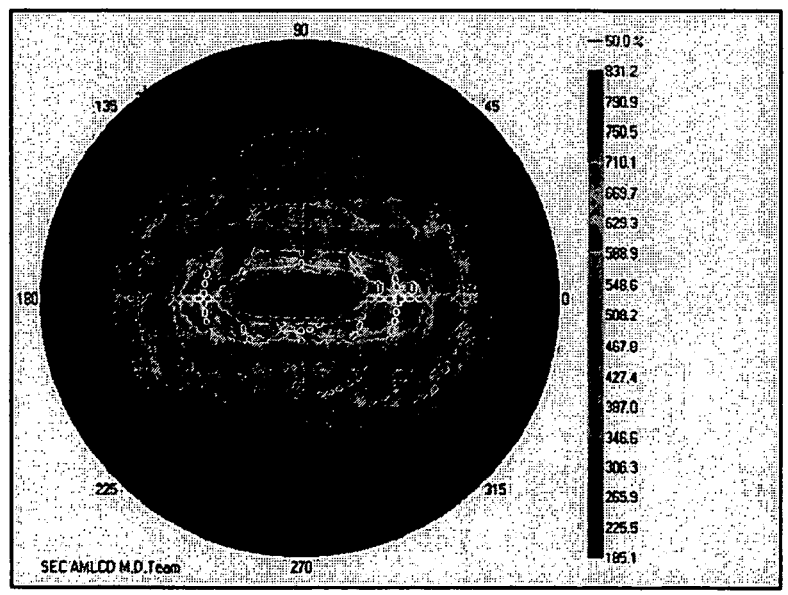
Figure 14:
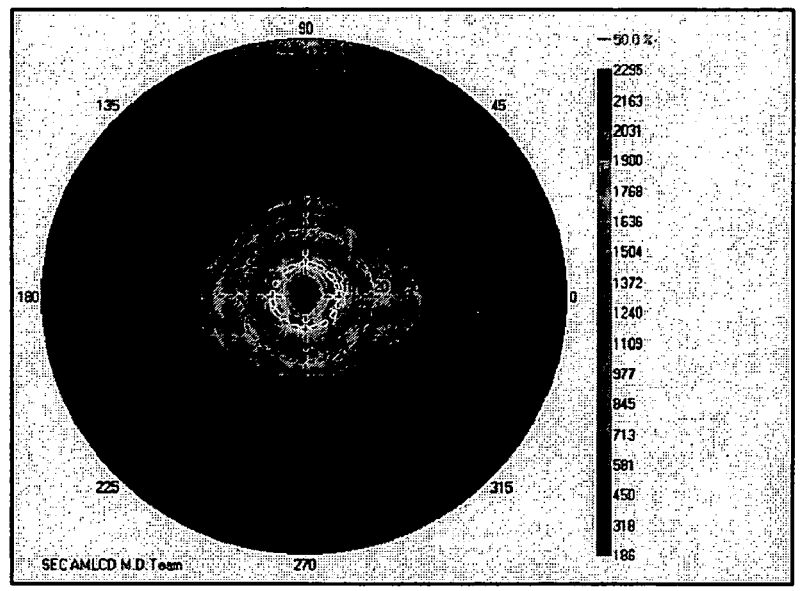
FIGS. 14 and 15 are graphs illustrating results of measurement of the brightness of light at a near portion and a far portion of the backlight unit of FIG. 6, according to the first exemplary embodiment of the present invention, respectively.
Figure 15:
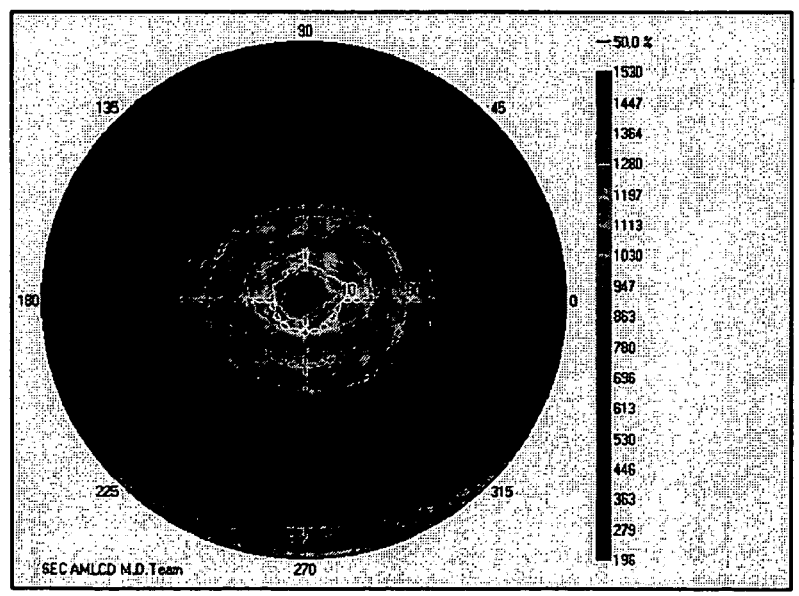

To further show the benefits of the invention, Applicants conducted an experimental comparison between the related art device illustrated in FIG. 1 and a device according to the invention. FIGS. 12 and 13 are graphs illustrating the brightness of a near portion and a far portion of the related art backlight unit of FIG. 1, respectively. FIGS. 14 and 15 are graphs illustrating the brightness of a near portion and a far portion of the backlight unit according to the first embodiment of the present invention (e.g., similar to FIG. 6), respectively.

FIGS. 12 and 13 show that the distribution of the brightness of the near portion is broader than that of the brightness of the far portion. In contrast, FIGS. 14 and 15 show that the distribution of the brightness of the near portion 140 is similar to that of the brightness of the far portion 150.

This difference results from the arrangement of the exemplary embodiment, where the azimuth angle of light incident upon the LGP 110 is reduced using the prism array 200. Accordingly, the distribution of the azimuth angle of the light incident upon the hologram pattern 130 is similar at both the near portion 140 and the far portion 150, and the brightness of the light emitting surface 112 can be adjusted to be uniform. Additionally, the transparent portions 202 according to the first embodiment allow light transmitted along the optical axes of the LEDs 120 to pass through the transparent portions 202 without reflection, thereby increasing light transmittance and further improving the brightness of the light emitting surface 112.

Experimental data reveals that the brightness of the light emitting surface 112 of the backlight unit according to the first embodiment is brighter by about 15% than the brightness of conventional backlight units.

Figure 16:
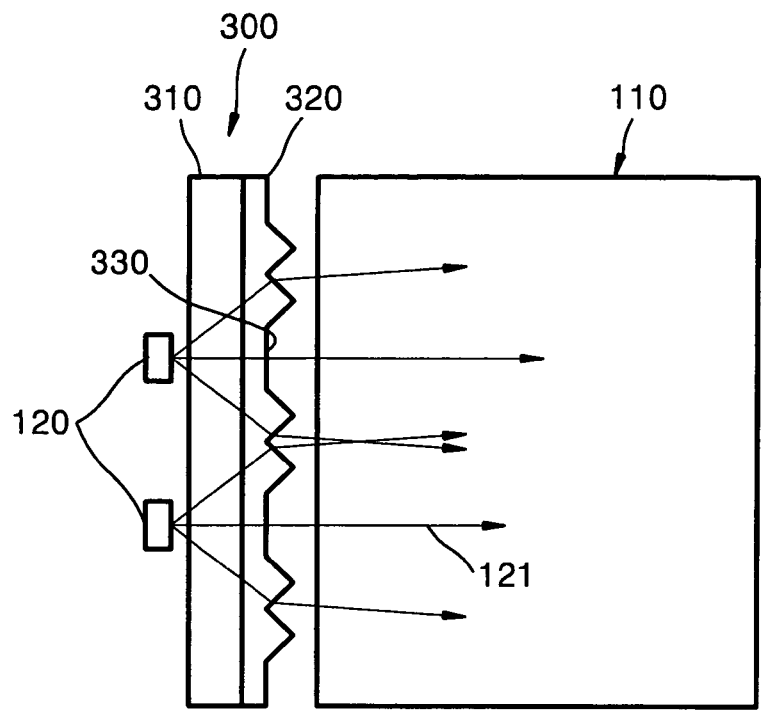
FIG. 16 is a plan view of a backlight unit according to a second exemplary embodiment of the preset invention.

FIG. 16 illustrates a backlight unit according to a second exemplary embodiment of the invention. Referring to FIG. 16, the backlight unit includes a prism array 300 in which a prism sheet 320 is attached to a bar-type transparent member 310. The transparent member 310 may be manufactured by cutting or ejection molding the material, and may be made of the same material used to make the LGP 110 of FIG. 6.

The prism sheet 320 is made by forming a prism structure on a transparent sheet. For instance, the prism structure may be formed by coating acryl-based resin on a PET film. The backlight unit according to the second embodiment may also include a transparent portion 330 that prevents the light from being totally reflected by the prism pattern in a region along an optical axis of the light source. Like in the backlight unit according to the first embodiment, the transparent portion 330 may be formed in the prism array by removing the prism pattern within a predetermined angle with respect to the optical axis of the light source. Alternatively, although it is not shown in the drawings, the transparent portion 30 may be formed by removing a portion of the prism array within a predetermined angle with respect to the optical axis of the light source.

Figure 17:
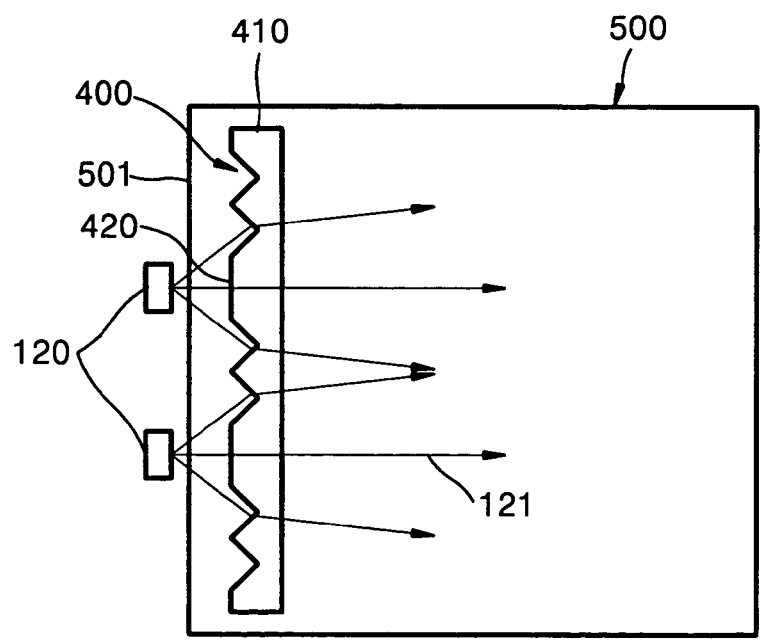
FIG. 17 is a plan view of a backlight unit according to a third exemplary embodiment of the present invention.

FIG. 17 is a backlight unit according to a third exemplary embodiment of the invention. The backlight unit of FIG. 17 includes a prism array 400 that is united with an LGP 500. Referring to FIG. 17, a hollow portion 410 is installed in the LGP 500 to pass through the LGP 500 in the vertical direction at a predetermined distance from an edge 501 of the LGP 500. The prism array 400, which has a V-shaped prism pattern with apexes facing the hollow portion 410 repeatedly arranged, is installed at a left side of the hollow portion 410. The inside of the hollow portion 410 is filled with a medium, e.g., air, which has a smaller index of refraction than the LGP 500 or the prism array 400. The backlight unit according to the third embodiment may further include transparent portions 420 that prevent the light from being totally reflected by the prism pattern in a region along an optical axis of the light source, as in the backlight unit according to the first and second embodiments. The transparent portion 330 may also be manufactured in the prism array by removing the prism pattern within a predetermined angle with respect to the optical axis of the light source. The LGP 500 may be manufactured using a cutting process or an injection molding process to be united with the prism array 400.

Backlight units according to the second and third embodiments have the same operating effects as a backlight unit according to the first embodiment.

As described above, a backlight unit according to the present invention has the following advantages.

First, a reduction in the azimuth angle of light, which is incident on an LGP, results in a uniform distribution of the azimuth angle of incident light that is incident on a hologram pattern. As a result, the distribution of the intensity of light transmitted to a light emitting surface becomes uniform, thereby increasing of the uniformity of the brightness of the light emitting surface.

Secondly, light reaching the optical axis of a light source is allowed to pass through a transparent portion, thereby preventing the deterioration of the brightness of the backlight unit.

Thirdly, if a hologram pattern is used, it is possible to maximize the efficiency of outputting light to the light emitting surface by uniformly maintaining the azimuth angle of light that is incident upon the hologram pattern. In this case, the brightness of the light emitting surface is also improved.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A backlight unit comprising:
a light guide panel (LGP);
a point light source emitting light and arranged at an edge of the LGP; and
a refraction member being positioned between the point light source and the LGP,
wherein the refraction member is shaped to refract the light emitted from the point light source toward an optical axis of the point light source in order to reduce an azimuth angle of light that is incident upon the LGP,
wherein the refraction member comprises a prism array of V-shaped prisms, wherein the V-shaped prisms comprise apexes facing the LGP,
wherein the refraction member further comprises a transparent member wherein the prism array is attached to the transparent member on a side adjacent the LGP,
wherein the refraction member further comprises a transparent portion arranged along the optical axis of the light source, wherein the transparent portion is shaped to prevent light emitted from the light source from being totally reflected, and
wherein the width of the transparent portion is determined so that a full width half maximum (FWHM) of the light emitted by the light source and incident upon the LGP is at a minimum value; and light flux/steradian is at a maximum value.

2. A backlight unit comprising:
a light guide panel (LGP);
a point light source emitting light and arranged at an edge of the LGP; and
a refraction member being positioned between the point light source and the LGP,
wherein the refraction member is shaped to refract the light emitted from the point light source toward an optical axis of the point light source in order to reduce an azimuth angle of light that is incident upon the LGP,
wherein the refraction member comprises a prism array of V-shaped prisms, wherein the V-shaped prisms comprise apexes facing the LGP,
wherein the refraction member further comprises a transparent member wherein the prism array is attached to the transparent member on a side adjacent the LGP,
wherein the refraction member further comprises a transparent portion arranged along the optical axis of the light source, wherein the transparent portion is shaped to prevent light emitted from the light source from being totally reflected, and
wherein the transparent portion is formed to allow light emitted from the point light source within an angle of ±12° with respect to the optical axis of the point light source to pass through.

3. A backlight unit comprising:
a light guide panel (LGP); and
a point light source emitting light at an edge of the LGP,
wherein a refraction member is formed in the LGP to refract light emitted from the point light source as the light emitted from the point light source enters the LGP,
wherein the refraction member is shaped to refract the light emitted from the point light source toward an optical axis of the point light source, and
wherein the refraction member comprises:
a hollow portion extending in a direction parallel to a light emitting surface of the LGP on a side of the LGP adjacent to the light source; and
a prism array of V-shaped prisms arranged on an edge of the hollow portion adjacent to the light source, wherein the V-shaped prisms comprise apexes extending into the hollow portion.

4. The backlight unit of claim 3, wherein the apexes are formed by an angle between 80° to 120°, inclusive.

5. The backlight unit of claim 3, wherein the refraction member further comprises a transparent portion arranged along the optical axis of the light source, wherein the transparent portion is shaped to prevent light emitted from the light source from being totally reflected.

6. The backlight unit of claim 5, wherein the transparent portion is formed in the prism array by removing a portion of the V-shaped prisms that are arranged within a predetermined angle with respect to the optical axis of the light source.

7. The backlight unit of claim 5, wherein the width of the transparent portion is determined so that a full width half maximum (FWHM) of the light emitted by the light source and incident upon the LGP is at a minimum value; and light flux/steradian is at a maximum value.

8. The backlight unit of claim 5, wherein the transparent portion is formed to allow light emitted from the point light source within an angle of ±12° with respect to the optical axis of the point light source to pass through.

9. The backlight unit of claim 5, wherein a plurality of light sources and transparent portions are provided in a one-to-one relationship.

* * * * *